United States Patent
Mekuria et al.

(10) Patent No.: US 10,511,696 B2
(45) Date of Patent: Dec. 17, 2019

(54) SYSTEM AND METHOD FOR AGGREGATION, ARCHIVING AND COMPRESSION OF INTERNET OF THINGS WIRELESS SENSOR DATA

(71) Applicant: CodeShop, B.V., Amsterdam (NL)

(72) Inventors: Rufael Negatu Mekuria, Amsterdam (NL); Arjen Wagenaar, Amsterdam (NL); Dirk Griffioen, Arnhem (NL)

(73) Assignee: CodeShop, B.V., Amsterdam (NL)

( * ) Notice: Subject to any disclaimer, the term of this patent is extended or adjusted under 35 U.S.C. 154(b) by 226 days.

(21) Appl. No.: 15/597,315

(22) Filed: May 17, 2017

(65) Prior Publication Data

US 2018/0338017 A1    Nov. 22, 2018

(51) Int. Cl.
   G06F 15/16    (2006.01)
   H04L 29/06    (2006.01)
   H04L 29/08    (2006.01)

(52) U.S. Cl.
   CPC .......... *H04L 69/04* (2013.01); *H04L 67/1097* (2013.01); *H04L 67/12* (2013.01)

(58) Field of Classification Search
   CPC ...... H04L 69/04; H04L 67/1097; H04L 67/12
   See application file for complete search history.

(56) References Cited

U.S. PATENT DOCUMENTS

| | | | |
|---|---|---|---|
| 9,491,499 B2 | 11/2016 | Wagenaar et al. | |
| 2013/0086215 A1* | 4/2013 | Trotta | G06F 16/29 709/217 |
| 2014/0241354 A1 | 8/2014 | Shuman et al. | |
| 2014/0244834 A1 | 8/2014 | Guedalia et al. | |
| 2014/0324973 A1 | 10/2014 | Goel et al. | |
| 2015/0156266 A1 | 6/2015 | Gupta | |

(Continued)

FOREIGN PATENT DOCUMENTS

WO    WO-2017137832 A1 *    8/2017    ........... G01F 23/292

OTHER PUBLICATIONS

Kammerl; Compressing Point Clouds; Jun. 1, 2011; http://pointclouds.org/news/2011/06/01/compressing-point-clouds/; 3 pages.*

(Continued)

*Primary Examiner* — Richard G Keehn
(74) *Attorney, Agent, or Firm* — Pablo Meles (57) ABSTRACT

A system and method to compress, aggregate and archive Internet of Things data originating from sensors can use a point cloud based geometric data model and a distribution and aggregation method based on compressed point cloud representations. The compression can occur at a gateway or a point of presence near the access point, or alternatively in an IoT server located anywhere else in a network, such as in a core data center. In one embodiment a cloudlet in an access point performs the data modeling and compression at the access point. In some embodiments, a system or method stores and distributes data to relevant entities formatted in a point cloud based model that combines (x,y,z) geometry attributes with values attached in the attributes (a1, a2, a3) and uses point cloud compression. A receiver can then decode the point cloud and recompose the aggregated sensor data, enabling inspection of the data.

20 Claims, 4 Drawing Sheets

(56) References Cited

U.S. PATENT DOCUMENTS

| | | | |
|---|---|---|---|
| 2015/0268058 A1* | 9/2015 | Samarasekera | G06K 9/00637 701/409 |
| 2015/0381776 A1 | 12/2015 | Seed et al. | |
| 2016/0086353 A1* | 3/2016 | Lukac | G06T 9/00 345/419 |
| 2016/0087933 A1 | 3/2016 | Johnson et al. | |
| 2016/0182466 A1 | 6/2016 | Wagenaar et al. | |
| 2016/0182582 A1 | 6/2016 | Wagenaar et al. | |
| 2016/0239585 A1* | 8/2016 | Leppanen | G01S 5/0263 |
| 2016/0358477 A1* | 12/2016 | Ansari | G08G 1/167 |
| 2018/0063079 A1* | 3/2018 | Ding | H04L 9/16 |
| 2018/0122506 A1* | 5/2018 | Grantcharov | G06F 19/3481 |
| 2018/0139565 A1* | 5/2018 | Norris | H04S 7/304 |
| 2018/0249274 A1* | 8/2018 | Lyren | H04S 7/303 |
| 2018/0288179 A1* | 10/2018 | Bhatia | H04L 45/00 |
| 2018/0329617 A1* | 11/2018 | Jones | G06F 3/04847 |
| 2019/0056258 A1* | 2/2019 | Gelada Camps | G01F 23/292 |

OTHER PUBLICATIONS

Soma Bandyopadhyay, and Arpan Pal. 2015. Arijit Ukil, "IoT Data Compression: Sensor-Agnostic Approach.," in Data Compression Conference (DCC '15), Snowbird, 2015, pp. 303-312.

Joao Mota, Miguel Rodrigues, Nikolaos Deligiannis Evangelos Zimos, "Internet-of-Things Data Aggregation Using Compressed Sensing with Side Information,", Thesalonikki, 2016.

ETSI, "Mobile Edge Computing (MEC); Framework and Reference Architecture," ETSI GS MEC 003, 2016.

Z. Chen, K. Ha, W. Hu, W. Richter and P. Pillai M. Satyanarayanan, "Cloudlets: at the leading edge of mobile-cloud convergence,", 2014.

Intel. (2016) Intel IoT gatway technology Product Bried: Turn Edge Data into Real Value Now, pp. 1-3.

EU 5G PPP Architecture Working Group, "View on 5G Architecture," Version 1.0, Jul. 2016.

Y. Huang and J. Peng Y. Fan, "Point cloud compression based on hierarchical point clustering,", Kaohsiung, 2013, pp. 1-7.

R. Mekuria K. Blom, P. Cesar, "Design, Implementation and evaluation of a point cloud codec for tele-immersive video," IEEE trans on circuits and systems for video tech 2016.

LoRa Alliance, Inc., LoRaWAN Specification (2016), pp. 1-70.

* cited by examiner

SYSTEM AND METHOD FOR AGGREGATION, ARCHIVING AND COMPRESSION OF INTERNET OF THINGS WIRELESS SENSOR DATA

BACKGROUND

Field of the Invention

The present disclosure generally relates to computer systems and methods, and more particularly relates to applications that handle large amounts of data resulting from the Internet of Things applications in Wireless Sensor Network systems (WSN) and Low Power Wide Area Networks (LPWAN).

Description of the Related Art

The Internet of Things (IoT) involves the use of many sensors distributed in space and organized in a wireless sensor network (WSN) or low power wide area network (LPWAN) and can include many other devices with connectivity using the Internet Protocol (IP) or other link layer protocols (e.g. the LoRa protocol defined by Lora Alliance (as represented on their website www.lora-alliance.org as of May 17, 2017) or other comparable initiatives to support Internet of Things). These technologies enable remote monitoring of large distributed physical and non-physical systems, and applications related to the Internet of things often dealing with thousands to millions of devices providing multiple measurements of objects. The sensors that communicate the IoT data are either mounted on fixed locations or mobile without a fixed location and produce small amounts of data. However, sensors in a LPWAN can be numerous ranging from thousands to hundreds of thousands still producing large amounts of IoT data. Handling these large amounts of data is expected to be even more important in the next generation infrastructure such as 5G mobile networks, smart cities and distributed edge clouds that will enable a much larger number of devices to be connected, fueling adoption of the Internet of things.

Example applications that benefit from massively connected sensor devices and networks are in environmental monitoring, where sensors are used to monitor geographic conditions, such as for example for water or flood management and/or warning systems for earth quakes or tsunamis. In such scenarios many geographically distributed sensors are used to measure values or respective physical quantities. Another Internet of things technological area that involves sensors organized in networks centers around the smart city theme, where sensors are used to make better use of infrastructure and public services and improve the quality of urban living environments. Examples include using sensors to monitor the health of monumental buildings, monitoring street lighting systems, monitoring air quality and parking availability (smart parking). Municipalities deploy these applications aiming to act as early technology adopters to improve services for their citizens.

Alternatively, there are many other applications identified that make use of the Internet of Things technologies such as monitoring rural infrastructure like bridges, railway tracks, and offshore windfarms. In addition, other applications can be found in the automotive industry, in the medical world and in manufacturing.

In each of these application areas, the IoT faces key challenges to operate in a heterogeneous environment where sensors use different link layer technologies. Different link layer technologies like Bluetooth, Wifi, 802.11.15.4, ZigBee, LoRa and different higher level protocols like XMPP, UPnP and many others are often used. Sometimes proprietary IoT signaling schemes operating in ISM band do not always work well together and IoT gateways are needed to translate these different protocols and link layers to the IP protocol, preferably based on IP version 6 to make use of a wide universal address space, and bridge them to make them fully connected to the Internet. An example, the LoRa protocol developed by the LoRa alliance specifies a MAC (Medium Access Control) layer based on beaconing transmission and reception timeslots and physical Layer (PHY) based Frequency Key Shifting and Spread Spectrum techniques enabling Low Power Wide Area Networks (LPWAN). In such LPWANs the access gateway functions as an aggregation point that bridges the data into the IP Network changing it from Lora to IP based protocols.

While current technological advances focus on the gateway functionality to enable interoperability and bridging between different link layer technologies, a problem that remains even if this challenge has been fully resolved is that in all these applications a large amount of data is produced by these sensors resulting in huge storage and communication resource needs. While in some applications it is only necessary to read and interpret information once, often data transmission and storage are critical to the IoT application (e.g., smart city, environmental monitoring, infrastructure monitoring). In some cases, such storage and transmission requirements might even be mandatory to store data to comply with jurisdictional standards or with recommended best practices. The need for transmitting the data later for processing by entities (analytics or graphing) could also become a burden to the communication link bandwidth. These are two critical problems for emerging IoT and sensor network applications that are extremely urgent.

Some pioneering work on IoT compression focuses on compression of the data sent out by the different individual sensor nodes. For example the work by Soma Bandyopadhyay, Arpan Pal, and Arijit Ukil, entitled "IoT Data Compression: Sensor-Agnostic Approach," in *Data Compression Conference (DCC '15)*, Snowbird, 2015, pp. 303-312 describes developing a sensor content information centric approach where the compression is optimized based on the information theoretic properties of the original sensor signal. Alternatively, the work by Joao Mota, Miguel Rodrigues, Nikolaos Deligiannis Evangelos Zimos, entitled "Internet-of-Things Data Aggregation Using Compressed Sensing with Side Information," Thesalonikki, 2016 develops a sparse representation and compression method for Internet of things data by using compressive sensing techniques that allow devices to be off much of the time and only collect the data at given instants. Typically, the compression of IoT data is often very concerned with low power usage at the nodes and spectrum sharing for efficient communication (using sleep modes).

However, when aggregating information from each of the sensors in a server or edge based node, the amount of storage needed to store the data is still significant as many individual sensor data is accumulated. The low power requirement is typically already addressed by the IoT protocol such as Lora. However, the data aggregation at the gateway is a different problem as it considers the large volumes of IoT data resulting from geographically distributed different sources and therefore requires a different approach. For example, Low Power Wide Area Networks enabled by the LoRa protocol could span kilometers and thousands to millions of sensors. Even if each of the sensors produces a few Kilo bytes per second, the total amount of data produced is still large, especially if daily/monthly/yearly archives need to be kept.

Alternatively to reduce the size of such data, naïve compression schemes could be used such as based on deflate/inflate such as available in the gzip and winzip software. However such approaches give only limited compression efficiency (up to 3x) and only lossless data compression is provided. For large scale geographically distributed information more efficient and lossy schemes are sought for to fit with the use cases of archiving and low bit-rate communication.

SUMMARY

The embodiments herein disclose a system and method to compress, aggregate and archive collected internet of things and other wireless sensor data that is aggregated at IoT gateways. The method and system take spatial correlation between sensors into account to achieve better compression performance. Especially if all the data needs to be stored and archived, which is often the case in many mission critical applications, the storage cost of the Internet of Things application is dramatically reduced by the approach presented herein. In addition, the embodiments support that the information can become available again and can be distributed to a location where it can be inspected using graphical tools, analytics or other types of processing or control systems. The embodiments herein deal with all common requirements.

The presented embodiments are also critical from a business perspective and in the development of Internet of Things (IoT) data. To highlight the extended utility and applicability of the embodiments, the relevance to the next generation of mobile networks (5G) also aims to provide native support for the Internet of things data by enabling a 10 to 100 times increase in the number of connected devices. The European plans for 5G have been formulated by the 5G public private partnership (5GPPP) which includes support for large scale sensor data. The apparatus, systems and methods according to the embodiments could be embedded in this network architecture such as in an edge or server side compute instance or a Virtual Network Function (VNF) for processing IoT data.

To summarize, some embodiments use an approach that enables efficient lossy and lossless aggregation and archiving of IoT data based on compression of Internet of things and wireless sensor data. As such, embodiments herein are expected to be considered in the next generation networks. This future network could include technologies like LTE-MTC, NB-IOT, LoRa etc.

Some embodiments disclose a system and method to compress, aggregate and archive Internet of Things data originating from large-scale wide-area sensor networks (WSNs) and/or from Low Power Wide Area Networks (LPWANs). Some embodiments include a data model for Internet of Things data based on a point cloud based geometric data model and an efficient distribution and aggregation method based on compressed point cloud representations. The compression can happen in the gateway or point of presence near the access point near the base station, or alternatively in an IoT server located anywhere else in the network, such as in a core data center. In one embodiment, a computational unit near the gateway called a cloudlet in an access point of a network performs the data modeling and compression. In another embodiment, an application in the mobile edge network can be used to collect the data and create the point cloud model and compress it. The system and method disclosed stores and distributes data to relevant entities formatted in a point cloud based model that combines (x,y,z) geometry attributes of the mounted or mobile sensors with values attached in the attributes (a1, a2, a3) and uses a point cloud compression technique. In one exemplary embodiment, the data is collected at a server running at the core where it is modeled in a point cloud data model is subsequently compressed and stored. The receiver can then decode the point cloud data and recompose the aggregated sensor data, enabling inspection of the data using graphical tools, analytics or other systems used to extract added value from the Internet of Things data.

BRIEF DESCRIPTION OF THE DRAWINGS

The accompanying figures, in which like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

The present disclosure relates to a method and system for compression and aggregation of data collected from the wireless sensors that can be applied beyond the IoT gateway in the network edge or core servers. Embodiments herein can solve, among other things, the important problem of distributing, aggregating and archiving the abundance of wireless sensor and other Internet of Things data that is rapidly becoming available in large quantities.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
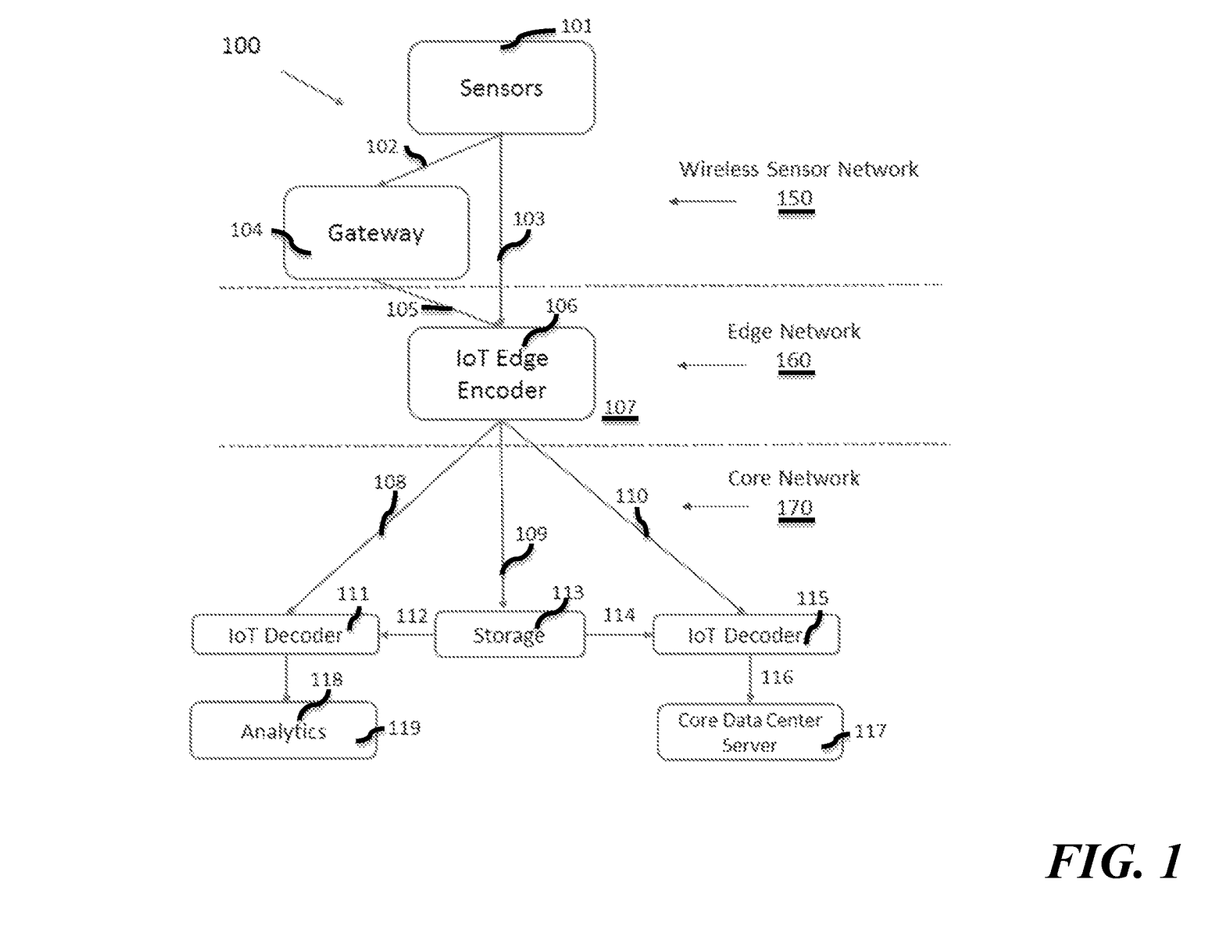
FIG. 1 is a depiction of a system or method for aggregation, archiving and compression of Internet of Things wireless sensor network (WSN) or low power area network (LPWAN) data according to various embodiments of the present disclosure.

The system 100 of FIG. 1 illustrates the schematic of an exemplified embodiment distributing, aggregating and archiving the abundance of wireless sensor and other Internet of Things data. Sensors 101 represent Internet of Things sensor nodes that are located at a position in space that can be specified in a coordinate system (x,y,z) and provides a number of measurements a1,a2,a3, etc. at different times t1, t2, t3 . . . . This position can be fixed or changing over time. The sensors data 102, 103 is collected at the IoT edge node 107 that contains the IoT encoder 106. The sensor data can possibly be collected at the IoT edge node 107 through a gateway 104, to be compressed at the IoT Edge encoder 106, and then the compressed data can be stored or alternatively distributed to other nodes that decode the IoT data for analytics, processing or visualization.

FIG. 1. Further illustrates in an exemplary embodiment where the Internet of things and wireless sensor or low power wide area network 150 (WSN, LPWAN) and accompanying data often originates from devices and sensors 101 that are connected via an IP based network link 103 to an edge node 107 (via edge node encoder 106) or via a non-IP based network link 102 through a gateway 104 to an IP based network link 105 such as the edge network 160 or a core network 170 to the IoT Edge encoder 106. The edge network 160 could be based in some embodiments on a cloudlet located near a WiFi access point or on a mobile edge compute node near a base station. In case of a Low Power Wide Area Network such as one based on LoRa, the IoT edge encoder 106 can be located near the gateway 104, which in this case is a LoRa gateway. The edge network 160 and edge node 107 share the property that they are physically near the Wireless Sensor Network of Low Power Wide Area Network 150 enabling them to run services and applications with improved connectivity, low latency and high bandwidth. In some embodiments, the IoT Edge Encoder 106 runs in the edge network 160 on the edge node 107. Some embodiments include the method for compressing, archiving and distributing Internet of Things data at the edge node 107. Alternatively, the disclosed method and system could be implemented in the core network 170 in some embodiments. The core network 170 refers to the core networks that make up the Internet and datacenters such as those from popular cloud service providers such as Amazon, Google and Microsoft. In an exemplified embodiment, the IoT encoder 106 runs as a process or service at a location in the edge network 160, either on a physical server or a virtualized server instance such as based on OpenStack, Amazon Cloud, VMWare, Docker or other virtualization or containerization technologies. In case the IoT network is not connected to the general Internet, the core network could refer to the private backbone of the IoT network based on proprietary technologies, not pre-clouding usage of Internet protocol based technologies.

Examples of sensors 101 in FIG. 1 can include mobile devices such as smart phones or IP connected cameras, thermometers, pressure sensors, or any other device used to measure physical or non-physical quantities with some sort of wired or wireless connectivity. The gateway 104 can be any gateway necessary to link the wireless sensor network to the IP network. Examples of IoT gateways include the IoT gateway technology from Intel Corporation. The IoT gateways convert the IoT protocol to IP based protocols and/or provides network address translation (NAT) enabling the device information to be routed through the Internet enabling Internet connectivity. Alternatively the gateway 104 can also be a protocol bridge, for example converting LoRa protocol messages to Internet Protocol based messages as defined by LoRa alliance.

In some embodiments, the IoT Edge encoder 106 runs as a service or program on physical or virtualized hardware at relative physical proximity near the wireless sensor network or LPWAN 150, the gateway or base station in the so called edge network 160. The IoT encoder 106 receives the IoT data through the link 103 or link 105 when using a gateway and compresses the IoT data such that the IoT data is stored in servers or storage 113 residing in the core network 170. Alternatively the compressed data resulting from the edge IoT encoder 106 can be transmitted to a IoT decoder 111 or 115 residing in the core network via an IP based protocol such as a protocol based on the transmission control protocol (TCP) or any other higher level IP based protocol via respective links 108, 110. The IoT decoders 111 and 115 can decode the IoT data and pass it to an analytics module 119 or another core data center server 117 running in the core data center that performs other essential parts of the Internet of things enabled application that creates the added value of the application.

Figure 2:
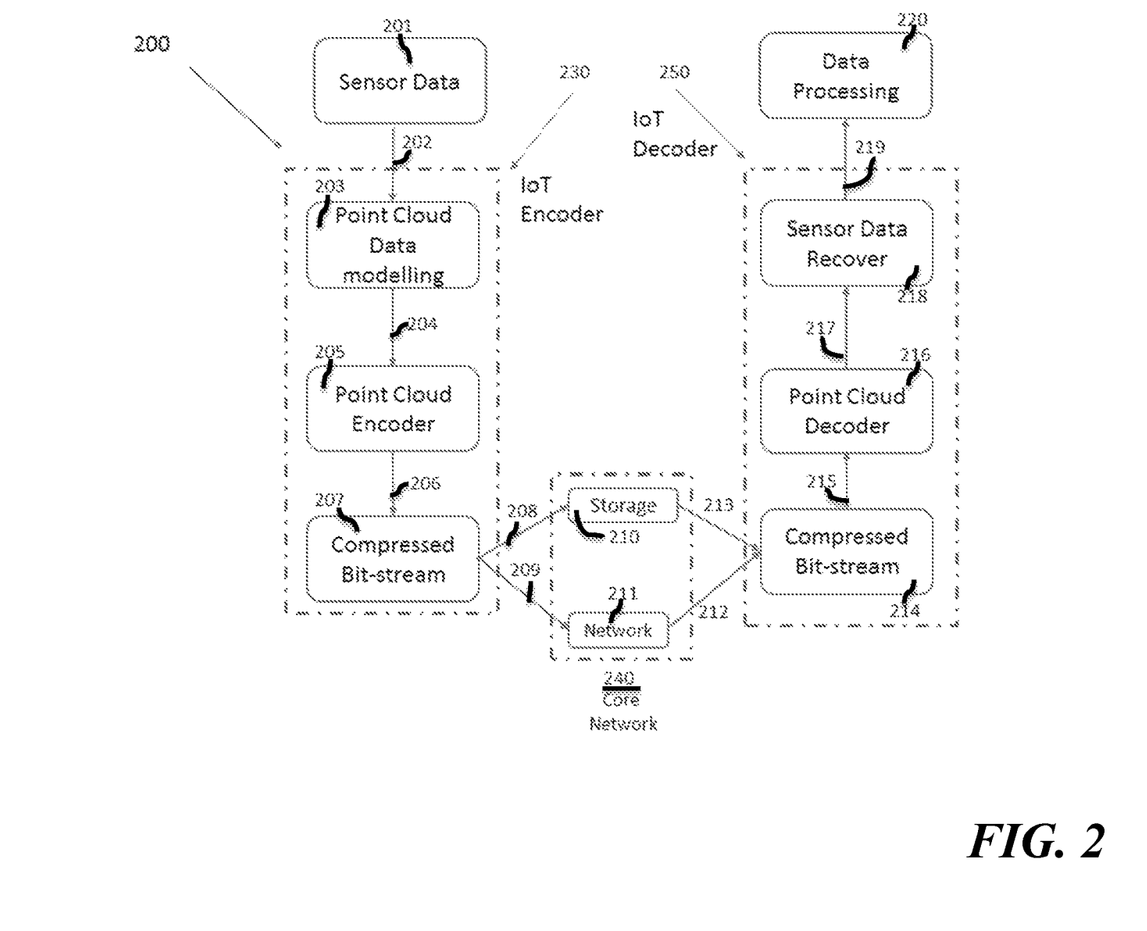
FIG. 2 is another depiction of a system or method for aggregation, archiving and compression of Internet of Things wireless sensor data according to various embodiments of the present disclosure.

The system 200 of FIG. 2 illustrates an IoT encoder 230 and decoder 250 in an exemplified embodiment with additional detail. The sensor data module 201 is modeled in to a point cloud data model by point cloud data modeling 203 via link 202 that is coupled via link 204 to a point cloud encoder 205 resulting in a compressed bit-stream 207 coupled via link 206. The bit-stream 207 is stored in storage 210 or communicated through a network 240 such as a core network to the decoder 250. The compressed bit-stream 214 can communicate via link 215 and be decoded by the point cloud decoder 216 to a point cloud 217, from which the original sensor data 201 can be recovered at sensor data recovery module 218 for simultaneous or subsequent visualization and analytics via link 219 at the data processing module 220.

Referring again to FIG. 2, the method and system 200 for compression and archiving of IoT data disclosed describes the edge encoder 107 and edge decoder 111 in FIG. 1 in greater detail in corresponding blocks 230 and 250 respectively. The sensor data module 201 sends data through the link 202 to the IoT encoder 230 where the IoT data is first modelled at block 203 as point cloud data that comprises coordinates (x,y,z) related to the sensor positions bundled with measurement values over time (a1, a2, a3, . . . ) that correspond to the respective sensor measurements.

The (x,y,z) values can be obtained either by storing the fixed coordinates of mounted sensors. One could make a mapping between these positions and the related fixed ID tags of sensors (MAC address or ID tag in Lora) at the gateway. Alternatively, for mobile sensors the position could be inserted by the application in a data specific field in the message. Any method that makes the (x,y,z) values available could be used including active measurements.

This point cloud based data is fed via link 204 to the point cloud encoder 205, that uses a point cloud compression technique such as a technique based on an octree composition and serialization to compress the sensor data of the application in a progressive and lossy manner, while not precluding lossless compression modes. The point cloud codec outputs via link 206 the compressed bitstream 207 that can be stored in a storage 210 or sent directly over a network 211 to an entity for decoding and consuming the IoT data such as the IoT decoder 250 where it will be retrieved, either from storage 210 via link 213 or through a network link 211 via link 212 as a retrieved compressed bitstream 214 that will be passed via link 215 to the point cloud decoder 216 that decodes the original point cloud data. A link 217 passes the decoded original point cloud data to the sensor data recovery module 218 that recovers the sensor data in a native sensor data format. This native sensor data is then available for further processing via data processing module 220 or as illustrated in FIG. 1. Using an analytics module 119 or a server 117 in the core network 170 that is part of the larger Internet of things application or system, such further processing is achieved. This IoT Data processing is illustrated as 220 in FIG. 2.

The sensors 101 that collect sensor data 201 in an Internet of things scenario in a wireless sensor or low power wide area network can produce many kinds of data related to physical quantities like pressure, temperature, lighting conditions, sound waves, electro-magnetic radiation or any other types of values. Such sensors can be connected using different link layers and possibly organized in a wireless sensor network (WSN) that interconnects each of the sensors or directly through a gateway. Link layer technologies can include Bluetooth, Wifi, IEEE 802.15.4 or customized link layer protocols. An important task to enable the Internet of things lies in the gateway 104 that translates different link layers and higher level protocols into IP based protocol and bridge the data. This way the Internet of things scenario is achieved as the things can achieve connectivity through the gateway to the general purpose Internet. Then beyond this gateway 104 the sensor data will be available in the Internet where it can be further processed.

Referring to FIGS. 1 and 2, higher level data sent over link 105 resulting from the gateway 104, in some embodiments, can be retrieved at the IoT encoder running at the edge node 107 where it is modeled in to a point cloud data format. A point cloud 203 comprises a plurality of coordinate tuples (x,y,z) linked with any number of attributes (a1, a2, a3 . . . ) and is a data format commonly used in computer graphics applications for presenting three dimensional (3D) object based data. A point cloud can contain a few (hundreds) up to billions of these tuples [(x,y,z), a1, a2, a3 . . . ] to represent the object. Derivation of such a point cloud based data model for IoT data is referred to as a point cloud modeling technique. To reduce the size of 3D objects encoders and decoders for point clouds have been developed such as described by Y. Huang and J. Peng Y. Fan, in the article entitled "Point cloud compression based on hierarchical point clustering," Kaohsiung, 2013, pp. 1-7 or the approach under development in the Moving picture experts group based on the approach described by R. Mekuria K. Blom, P. Cesar, in their article entitled "Design, Implementation and evaluation of a point cloud codec for tele-immersive video," *IEEE transactions on circuits and systems for video technology*, 2016. Coding techniques for point cloud data are often based on octree composition as described in the previous work or based on different known techniques in the computer graphics literature. Some of the embodiments herein disclose the use of point cloud compression techniques such as point cloud encoding and decoding (using, for example, encoders and decoders 205, 206) for compression of IoT data resulting from wireless sensor networks (WSNs) and applications in Low power wide area networks. To achieve such results, the measurement values and the positions of the sensors are combined to create the [(x,y,z) (a1,a2,a3)] tuple that is an entry to the point cloud data model. This conversion can be done by combining the sensor positions in the coordinate space with respective measurement values. This conversion operation is referred to as a point cloud modeling technique. The point cloud data modeling 203 takes each of the sensor values together resulting in a point cloud data format (at 204) that can then be fed to the point cloud encoder 205 resulting in a compressed bitstream 207 that is more efficient for storage in a dedicated storage node 210 or transmission over a network 211 and corresponding link or links 209, 212. At the decoder side, where the IoT data is needed for analytics of inspection, the point cloud can be decoded, and sensor data can be recovered at 218 to obtain sensor data in the original format.

In some embodiments, the compressed bit-streams 207 can then be used for efficient archiving or aggregation by storing them on a disk, a dedicated storage or any other device capable of storing digital data. Also, the compressed bit-streams can be used for efficient communication over networks and the progressive representations such as lower level octrees can be used as an aggregate or low quality representation of the sensor data.

Figure 3:
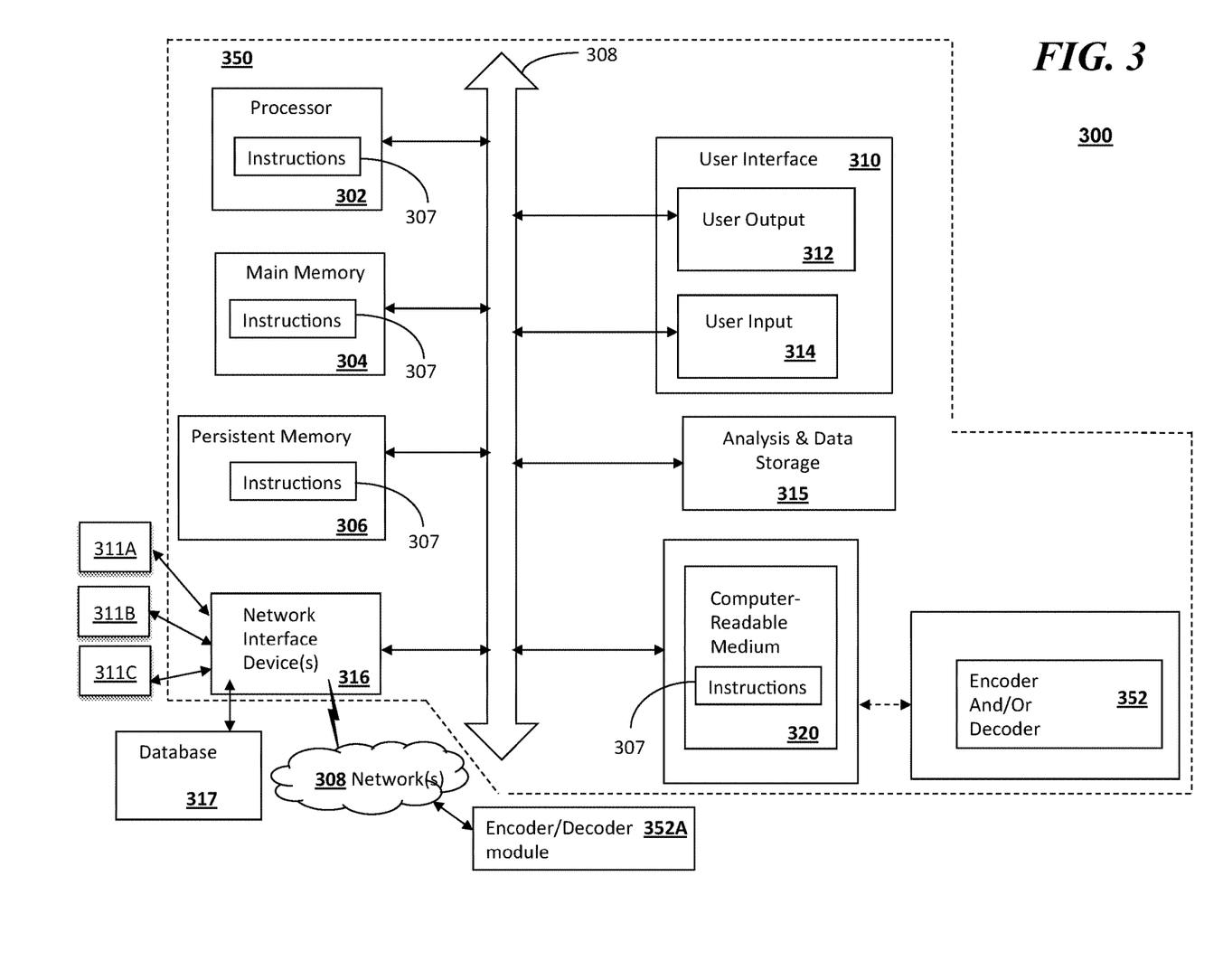
FIG. 3 is a block diagram of an information processing system according to various embodiments of the disclosure.

As shown in FIG. 3, an information processing system 350 of a system 300 can be communicatively coupled with the encoder or decoder module (or codec) 352 and a group of client or other devices, or coupled to a presentation device for display at any location at a terminal or server location. According to this example, at least one processor 302, responsive to executing instructions 307, performs operations to communicate with the module 352 via a bus architecture 308, as shown. The at least one processor 302 is communicatively coupled with main memory 304, persistent memory 306, and a computer readable medium 320. The processor 302 is communicatively coupled with an Analysis & Data Storage 315 that, according to various implementations, can maintain stored information used by, for example, the module 352 and more generally used by the information processing system 350. Optionally, for example, this stored information can include information received from the client or other devices such the sensors 311A, 311B, 311C or other sensors described above. For example, this stored information can be received periodically from the client devices or sensors and updated or processed over time in the Analysis & Data Storage 315. Additionally, according to another example, a history log can be maintained or stored in the Analysis & Data Storage 315 of the information processed over time. The module 352, and the information processing system 350, can use the information from the history log such as in the analysis process and in making decisions related to how to store, aggregate, and distribute IoT data.

The computer readable medium 320, according to the present example, can be communicatively coupled with a reader/writer device (not shown) that is communicatively coupled via the bus architecture 308 with the at least one processor 302. The instructions 307, which can include instructions, configuration parameters, and data, may be stored in the computer readable medium 320, the main memory 304, the persistent memory 306, and in the processor's internal memory such as cache memory and registers, as shown.

The information processing system 350 includes a user interface 310 that comprises a user output interface 312 and user input interface 314. Examples of elements of the user output interface 312 can include a display, a speaker, one or more indicator lights, one or more transducers that generate audible indicators, and a haptic signal generator. In some embodiments, the user output interface can include 3-D displays or virtual reality or augmented reality displays. Examples of elements of the user input interface 314 can include a keyboard, a keypad, a mouse, a track pad, a touch pad, a microphone that receives audio signals, a camera, a video camera, or a scanner that scans images. In some embodiments, inputs can be received from virtual reality goggles. The received audio signals or scanned images, for example, can be converted to electronic digital representation and stored in memory, and optionally can be used with corresponding voice or image recognition software executed by the processor 302 to receive user input data and commands, or to receive test data for example.

A network interface device 316 is communicatively coupled with the at least one processor 302 and provides a communication interface for the information processing system 350 to communicate via one or more networks 308. The network interface device can also couple to other external or remote training modules 352A via the network 308 which can operate independently or in conjunction with the training module 302. The networks 308 can include wired and wireless networks, and can be any of local area networks, wide area networks, or a combination of such networks. For example, wide area networks including the internet and the web can inter-communicate the information processing system 350 with other one or more information processing systems that may be locally, or remotely, located relative to the information processing system 350. It should be noted that mobile communications devices, such as mobile phones, Smart phones, tablet computers, lap top computers, and the like, which are capable of at least one of wired and/or wireless communication, are also examples of information processing systems within the scope of the present disclosure. The network interface device 316 can provide a communication interface for the information processing system 350 to access the at least one database 317 according to various embodiments of the disclosure.

The instructions 307, according to the present example, can include instructions for monitoring, instructions for analyzing, instructions for retrieving and sending information and related configuration parameters and data. It should be noted that any portion of the instructions 307 can be stored in a centralized information processing system or can be stored in a distributed information processing system, i.e., with portions of the system distributed and communicatively coupled together over one or more communication links or networks.

Figure 4:
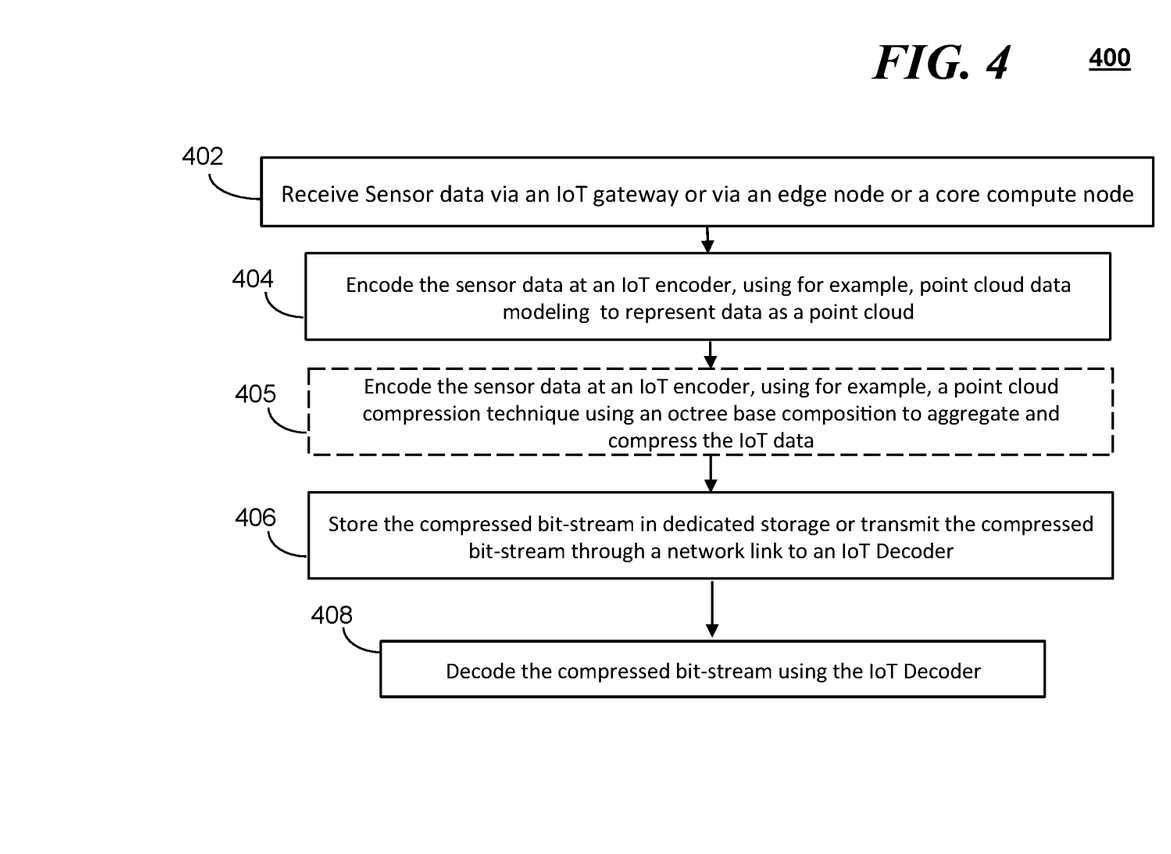
FIG. 4 is a flow diagram illustrating a method according to various embodiments of the present disclosure.

FIG. 4 illustrates an example of a method, according to various embodiments of the present disclosure, which can operate in conjunction with the information processing system of FIG. 3. Specifically, according to the example shown in FIG. 4, a method 400 includes the steps for aggregation, archiving and compression of Internet of Things wireless sensor data. The method 400 can include receiving sensor data from one or more sensors at block 402 via an IoT gateway or via an edge node or a core compute node. At block 404, the method 400 encodes the sensor data at an IoT encoder, using for example, point cloud modeling and compression which enables the representation of the data as a point cloud. At block 405, the method 400 can optionally encode the sensor data at an IoT encoder using a point cloud compression technique that uses an octree base composition to aggregate and compress the IoT. At block 406, the method stores the compressed bit-stream in a dedicated storage such as a server or other memory or alternatively the compressed bit-steam is transmitted to an IoT decoder via a network link. The method can then decode the compressed bit-stream using the IoT decoder at block 408.

Non-Limiting Examples

The examples provided herein may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure.

It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although the present specification may describe components and functions implemented in the embodiments with reference to particular standards and protocols, the disclosure is not limited to such standards and protocols. Each of the standards represents examples of the state of the art. Such standards are from time-to-time superseded by faster or more efficient equivalents having essentially the same functions.

The illustrations of examples described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. The examples herein are intended to cover any and all adaptations or variations of various embodiments. Combinations of the above embodiments, and other embodiments not specifically described herein, are contemplated herein.

The Abstract is provided with the understanding that it is not intended be used to interpret or limit the scope or meaning of the claims. In addition, in the foregoing Detailed Description, various features are grouped together in a single example embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

Although only one processor is illustrated for an information processing system, information processing systems with multiple CPUs or processors can be used equally effectively. Various embodiments of the present disclosure can further incorporate interfaces that each includes separate, fully programmed microprocessors that are used to off-load processing from the processor. An operating system (not shown) included in main memory for the information processing system may be a suitable multitasking and/or multiprocessing operating system, such as, but not limited to, any of the Linux, UNIX, Windows, and Windows Server based operating systems. Various embodiments of the present disclosure are able to use any other suitable operating system. Various embodiments of the present disclosure utilize architectures, such as an object oriented framework mechanism, that allows instructions of the components of operating system (not shown) to be executed on any processor located within the information processing system. Various embodiments of the present disclosure are able to be adapted to work with any data communications connections including present day analog and/or digital techniques or via a future networking mechanism.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "another", as used herein, is defined as at least a second or more. The terms "including" and "having," as used herein, are defined as comprising (i.e., open language). The term "coupled," as used herein, is defined as "connected," although not necessarily directly, and not necessarily mechanically. "Communicatively coupled" refers to coupling of components such that these components are able to communicate with one another through, for example, wired, wireless or other communications media. The terms "communicatively coupled" or "communicatively coupling" include, but are not limited to, communicating electronic control signals by which one element may direct or control another. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The terms "controller", "computer", "processor", "server", "client", "computer system", "computing system", "personal computing system", "processing system", or "information processing system", describe examples of a suitably configured processing system adapted to implement one or more embodiments herein. Any suitably configured processing system is similarly able to be used by embodiments herein, for example and not for limitation, a personal computer, a laptop personal computer (laptop PC), a tablet computer, a smart phone, a mobile phone, a wireless communication device, a personal digital assistant, a workstation, and the like. A processing system may include one or more processing systems or processors. A processing system can be realized in a centralized fashion in one processing system or in a distributed fashion where different elements are spread across several interconnected processing systems.

The corresponding structures, materials, acts, and equivalents of all means or step plus function elements in the claims below are intended to include any structure, material, or act for performing the function in combination with other claimed elements as specifically claimed. The description herein has been presented for purposes of illustration and description, but is not intended to be exhaustive or limited to the examples in the form disclosed. Many modifications and variations will be apparent to those of ordinary skill in the art without departing from the scope of the examples presented or claimed. The disclosed embodiments were chosen and described in order to explain the principles of the embodiments and the practical application, and to enable others of ordinary skill in the art to understand the various embodiments with various modifications as are suited to the particular use contemplated. It is intended that the appended claims below cover any and all such applications, modifications, and variations within the scope of the embodiments.

We claim:

1. A system for efficient storage, aggregation and distribution of Internet of things (IoT) data, comprising:
   one or more sensors providing sensor data;
   an IoT gateway coupled to the one or more sensors;
   an edge node or core compute node coupled to the one or more sensors, the edge node or core compute node comprising an IoT encoder for encoding sensor data into a compressed bit-stream;
   an IoT decoder for decoding the compressed bit-stream;
   a dedicated storage coupled to the IoT encoder and the IoT decoder for storing the compressed bit-stream;
   a network link coupled between the IoT encoder and the IoT decoder; and
   wherein the IoT encoder runs on the edge node or the core compute node and receives the sensor data via the IoT gateway and outputs the compressed bit-stream for storage on the dedicated storage or transmitted through the network link to the IoT decoder and wherein an x, y, z position in a fixed coordinate space of the one or more sensors is fixed or mobile and made available to the IoT Encoder and the IoT Decoder by embedding the x, y, z position in the IoT messages or made available to the IoT Encoder and the IoT Decoder as side information.

2. The system of claim 1, wherein the sensor data is collected at the IoT encoder for further processing and encoding using an Internet of things coder-decoder.

3. The system of claim 1, wherein the sensor data is collected at the IoT encoder and converts the sensor data into a point cloud based data format using a point cloud data modeling technique.

4. The system of claim 1, where an x,y,z position in a fixed coordinate space of the one or more sensors is fixed or mobile and made available to the IoT Encoder and the IoT Decoder by using physical estimations at the IoT gateway based on physical signal properties.

5. The system of claim 1, where an x,y,z position in a fixed coordinate space of the one or more sensors is fixed or mobile and made available to the IoT Encoder and the IoT Decoder by embedding the x,y,z position in the IoT messages.

6. The system of claim 1, where the x,y,z position in a fixed coordinate space of the one or more sensors is fixed and made available to the IoT Encoder and the IoT Decoder as side information.

7. The system of claim 1, wherein the sensor data is decoded and collected at a data center server at a core network and converted to a point cloud based data format using a point cloud data modeling technique.

8. The system of claim 1, wherein point cloud data converted by an IoT encoder at the edge node is compressed using a point cloud compression technique in a point cloud encoder resulting in the compressed bit-stream.

9. The system of claim 1, wherein the point cloud data converted at the core compute node is compressed using a point cloud compression scheme based on a point cloud encoder resulting in the compressed bit-stream.

10. The system of claim 1, wherein the IoT encoder uses any progressive point cloud coding technique to achieve lower resolution representations of an IoT dataset from the sensor data that is used as the compressed bit-stream.

11. The system of claim 1, wherein the IoT encoder is configured for using a lossless point cloud coding technique to enable high quality sensor data retrieval that is used as the compressed bit-stream.

12. The system of claim 1, wherein the compressed bit-stream is a compressed point cloud representation bit-stream stored in dedicated or non-dedicated storage on servers.

13. The system of claim 1, wherein the IoT decoder includes a point cloud decoder configured to retrieve Internet of things data extracted from the sensor data.

14. The system of claim 1, wherein the IoT decoder includes a point cloud decoder to decode point cloud data, which is further used to recover the sensor data.

15. A method for efficient storage, aggregation and distribution of Internet of things data, comprising:
   receiving sensor data via an IoT gateway or via an edge node or core compute node;
   encoding the sensor data at an IoT encoder using point cloud data modeling to provide a compressed bit-stream; and decoding the compressed bit-stream using an IoT decoder; and wherein an x, y, z position in a fixed coordinate space of one or more sensors is fixed or mobile and made available to the IoT Encoder and the IoT Decoder by embedding the x, y, z position in IoT messages or made available to the IoT Encoder and the IoT Decoder as side information.

16. The method of claim 15, wherein the IoT encoder runs on the edge node or the core compute node, receives the sensor data via a gateway, stores the compressed bit-stream in a dedicated storage or transmits the compressed bit-stream through a network link to the IoT decoder.

17. The method of claim 15, wherein the sensor data is collected at the IoT edge encoder that collects measurement data and converts the measurement data into a point cloud based data format using the point cloud data modeling.

18. The method of claim 15 where the compressed bit-stream is collected at a data center at a core network and converted to a point cloud based data format using the point cloud data modeling.

19. The method of claim 15, wherein the IoT encoder uses a point cloud compression technique using an octree base composition to aggregate and compress the IoT data to represent the sensor data as a point cloud.

20. Non-transitory computer-readable mediums having stored therein instructions which, when executed by at least one or more processors of at least two computing devices, cause a computer system to perform a method comprising:

receiving sensor data via an IoT gateway or via an edge node or core compute node;

encoding the sensor data at an IoT encoder using point cloud data modeling to provide a compressed bit-stream;

decoding the compressed bit-stream using an IoT decoder; and wherein an x, y, z position in a fixed coordinate space of one or more sensors is fixed or mobile and made available to the IoT Encoder and the IoT Decoder by embedding the x, y, z position in IoT messages or made available to the IoT Encoder and the IoT Decoder as side information.

* * * * *